Figure 1:
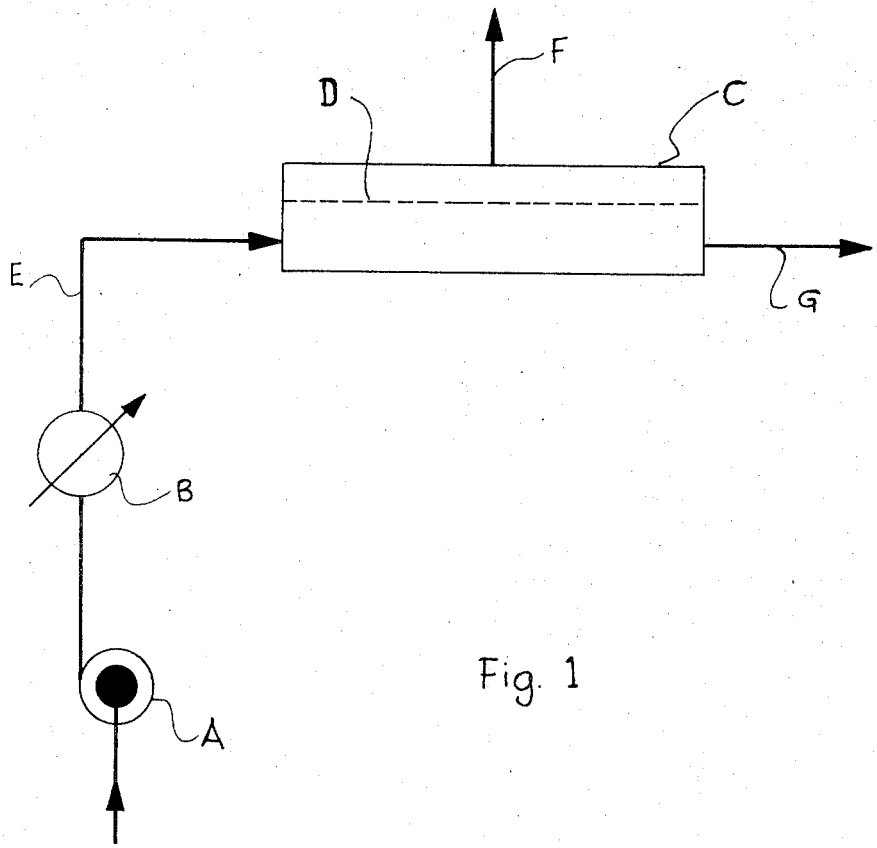

United States Patent [19]
Biondi et al.

[11] 3,792,570
[45] Feb. 19, 1974

[54] PROCESS AND PLANT FOR THE ISOTOPIC ENRICHMENT OF URANIUM BY MEANS OF GASEOUS DIFFUSION

[75] Inventors: Leonardo Biondi; Alberto Vaudo, both of Milan, Italy

[73] Assignee: Montecatini Edison S.p.A., Milan, Italy

[22] Filed: Oct. 26, 1971

[21] Appl. No.: 192,182

[30] Foreign Application Priority Data
Oct. 29, 1970 Italy .............................. 89564 A/70

[52] U.S. Cl. ........................................ 55/16, 55/158
[51] Int. Cl. ............................................. B01d 53/22
[58] Field of Search ................................. 55/16, 158

[56] References Cited
UNITED STATES PATENTS
3,208,197   9/1965   Simon et al. ............................ 55/16

OTHER PUBLICATIONS
Benedict et al., Chemical Engineering Progress, Vol. 47, No. 2, pp. 57–59 and No. 3, p. 111.

*Primary Examiner*—Charles N. Hart
*Attorney, Agent, or Firm*—Stevens, Davis, Miller & Mosher

[57] ABSTRACT

Process and plant are disclosed for uranium isotopic enrichment which make use of per se known type elemental stages employed for enriching uranium through gaseous diffusion, said process and plant in their broader aspects being based on the features of enriching a flow of natural uranium hexafluoride up to the required $U^{235}F_6$ concentration by means of following partial enrichments of gradually increasing rate, obtained in a well defined set of elemental stages operating in successive periods and for different durations, according to following operative positions, under feeds at predetermined different enrichment rates, said different and gradually increasing enrichments being obtained by feeding the same set of elemental stages, in each subsequent operative position, with the product and waste flows obtained in the two contiguous operative positions, preferably replacing the gas of each stage with other gas having a concentration such as to permit said set of stages to duty operate in each of said operative positions, finally repeating or changing over said feed and said gas replacing several times, stage by stage, until the desired final concentration rate required both for the enriched and the waste flows is obtained.

13 Claims, 6 Drawing Figures

PROCESS AND PLANT FOR THE ISOTOPIC ENRICHMENT OF URANIUM BY MEANS OF GASEOUS DIFFUSION

This invention relates to a process for the enrichment of uranium hexafluoride ($UF_6$) in respect to its lightest component ($U^{235}F_6$), by means of gaseous diffusion through a set of per se known porous diaphragms called "barriers."

A plant for carrying out said process, and suitable for allowing the production of enriched uranium in quantity and $U^{235}$ concentration such as to satisfy the current requirements of the market, also falls within the scope of the invention.

It is well known that uranium is mainly found in nature in the form of the two isotopes $U^{235}$—herein present in the amount of about 0.71 percent—and $U^{238}$ present in the amount of about 99.28 percent.

To produce fuel for nuclear reactors of the so called "enriched uranium" type, the $U^{235}$ concentration must be increased to much higher values, generally ranging from 2 to 5 percent. A well known technique for obtaining such an enrichment is based on the principle of letting gaseous uranium hexafluoride—more exactly speaking, an isotopic mixture of natural uranium hexafluoride—diffuse through a plurality of suitable porous diaphragms called "barriers."

In the case of uranium hexafluoride, the enrichment of the $U^{235}F_6$ light component obtained by gaseous diffusion of the isotopic mixture through a barrier is in practice about 2 percent (two per mil), so that the mixture must go through the diffusion process numerous times in order to bring about the change from the $U^{235}$ natural concentration to the concentration of $U^{235}$ required for the desired end use.

To achieve this result, gaseous diffusion plants for the desired uranium enrichment according to current technology comprise a very large number (for example 1,500 to 2,000) of elemental suitably interconnected diffusion stages.

Each elemental stage—as shown in FIG. 1 of the accompanying drawings—consists of three main units; namely : stage compressor A for stepping up the gaseous mixture pressure (when several stages are cascade interconnected, as hereinafter shown) from the value downstream up to the value required upstream with respect to the barriers; heat exchanger B which by means of a suitable coolant eliminates or removes the heat developed in consequence of the gas compression; and a suitable diffuser C which is the fundamental unit or heat of the plant.

The diffuser C consists of a perfectly gas-tight shell internally provided with two or more tube plates. Tubular barriers D, nested in groups with suitable pitch or spacings are in a perfectly gas-tight manner elastically associated with said tube plates. The barriers consequently divide the diffuser into two chambers of relative high and low pressure.

The gas enters the diffuser at end E, and flows along the tube barriers through which it partially diffuses. The diffused gas collects in the low pressure chamber from which it is removed at point F through a suitable passage. The gas which does not diffuse is removed from the other end G of the diffuser.

Only one diffusion of gas passing through the barriers takes place in each elemental stage. Consequently, when leaving the stage, the feed gas has been split into a stream enriched by a ratio of about 2 percent (two per mil) in terms of its $U^{235}F_6$ concentration and into an impoverished stream.

Figure 2:
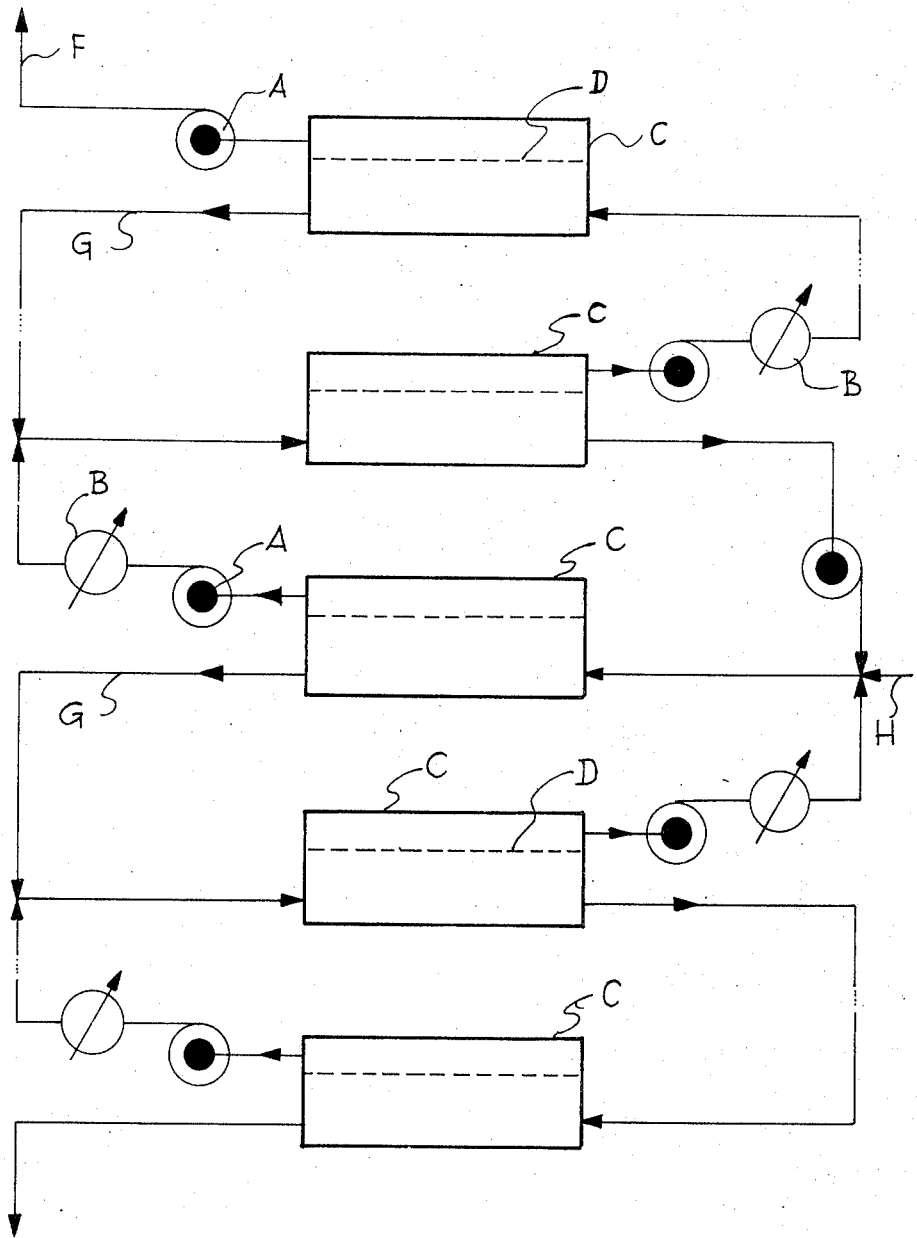

A number of elemental stages are shown for example according to the diagram sown in FIG. 2. In this figure the plant feed point is shown at H.

With reference to a series of stages, the diffused (and consequently enriched) stream F from each stage is conveyed to the following stage, while the non-diffused (and therefore impoverished) stream G is returned to the preceding stage. The feed to any given stage therefore consists of the enriched flow from the preceding stage and the impoverished flow from the following stage.

Recycle compressors, connected at regular intervals along the cascade circuit, compress the non-diffused gas in such a way as to compensate for the loss of pressure. The cascade circuit is fed at point H with an $U^{235}$ natural concentration stream and supplies both product and waste flows at concentrations respectively higher and lower than the feed concentration.

Point H, where the feed stream is introduced, divides the cascade circuit into two sections—an enrichment section and an impoverishment or recovery section—wherein the feed streams of the elemental stages—and consequently also the diffused products, which are proportional to the feed streams—decrease as the concentration of one of the isotopes of the gas mixture increases.

The cascade circuit theory establishes that the least work for the gas compression is attained by an "ideal" cascade wherein the dimensions of the elemental stages are different from stage to stage and exactly proportional to the corresponding gas streams therein.

On an industrial scale, for economic reasons, the cascade system is divided into a set of sub-plants, called "steps," each step consisting of stages which are all equal and dimensioned so as to achieve as nearly as possible the theoretical value for the diffused deliveries.

The gaseous diffusion plants for uranium enrichment are operated in such a way as to run continuously: all design and construction precautions are therefore to be taken for the purpose of guaranteeing the relevant high utilization coefficient.

The starting up of a big gaseous diffusion plant is furthermore a complicated operation which may require starting times of some months. When starting up, the plant receives a full charge of natural uranium hexafluoride. Then a nonproductive period begins during which no further feed and no removal of product takes place, and during which a gradual enrichment and impoverishment (respectively) of the gaseous mixture take place in the various stages until at last the final enrichment and the final impoverishment stages reach their respective rated or duty concentrations. At that moment the drawing off of the product and of the waste from the end stages is begun and the plant fed with natural $UF_6$, after which some further time is required for the plant to attain its design or duty flow rate.

As those skilled in the art know, the traditional isotopic separation plants for producing enriched uranium are very large industrial installations requiring tremendous investment and service costs, leading to very high productive capacities which in many cases are excessive with respect to the real demands of a whole, even national, market. It is also well known that small-scale plants do not lead to proportional total savings because of their reduced productive capacities, and on the contrary can give rise to a remarkable increase in the unit production costs. Under the technological conditions now prevailing, the competitive capacity threshold as regards production costs is reached by gaseous diffusion plants designed for a production capacity of around 700 to 1,000 tons/year of enriched uranium. Such a production is in many cases excessive, however, in relation to the real needs for enriched uranium.

An object of this invention is therefore the realization of a process for the isotopic enrichment of uranium, based on the gaseous diffusion principle, giving rise to productive capacities that are substantially reduced in comparison with those of the traditional plants, and yet producing enriched uranium at required enrichment rates at not remarkably increased unit costs.

Another object of the present invention is the realization of a plant for carrying out said process, which includes a very reduced number of elemental stages, said plant being able to work—always operating stage-by-stage according to the gaseous diffusion principle—in conformity with a suitable functional scheme in such a way as to allow productive capacities and enrichment rates satisfying the demand without involving (as traditional plants do) very high investments and service expenses.

These and other objects, which the following detailed description will make still clearer, are in practice attained by a process for uranium isotopic enrichment which makes use of elemental stages, all functionally and structurally identical to the stages already well known and employed for enriching uranium through gaseous diffusion, said process according to the present invention consisting in enriching a flow of natural uranium hexafluoride up to the required $U^{235}F_6$ concentration by means of following or successive partial enrichments of gradually increasing rate, and in particular by letting a well defined set of known-type elemental stages operate in successive periods and for different durations, according to following operative positions or phases, with feeds at different enrichment rates established in advance, such amounts of different and gradually increasing uranium enrichments being obtained by feeding the same set of elemental stages, in each subsequent process phase or operative position, with the product and waste flows obtained in the two contiguous operative positions; by repeating or changing over said feeds several times until attaining the final concentration rate required both for the enriched and the waste flows.

Speaking still more precisely, the stage-by-stage or phase-to-phase enrichment process according to the present invention contemplates, for its duty operation and at the end of each operative position, a sequence of operations consisting in stopping the diffusion process, in separately storing the enriched and the impoverished flows, in voiding the elemental stages (the gas of each stage being separately stored), in filling said stages again with quantities of gas having different and suitable enrichment rate, previously prepared, corresponding to the rates required for the duty operation in the subsequent operative position, said sequence of operations—followed by said change-over of the feeds—being adapted to bring about the regular operation of the set of stages in all the various following operative positions required for obtaining the final rate required both for the enriched and the impoverished flows.

All the quantities of differently enriched gas drawn off at the operation end in any operative position, namely at each change-over of the feed, product and waste, are—according to this invention—preferably stored in liquid form under suitable pressures and temperatures.

A plant particularly adapted to realize the above described gaseous diffusion enrichment process consists, according to this invention, of a set of known-type elemental stages which are cascade-interconnected in such a way as to supply, at the operation end in each operative position, quantities of enriched and impoverished gas, a feeding compressor and a heat exchanger being associated with each elemental stage and a recycling compressor being associated with the sets of stages, said plant comprising furthermore storage or operation reservoirs for the temporary storage of the enriched and impoverished gas quantities worked in the plant, a set of service reservoirs for the temporary storage of differently enriched gas quantities contained in each elemental stage in an idle plant, liquefaction means for storing in liquid form the various gas quantities, said elemental stages as well as said operation and service reservoirs being interconnected according to a flow diagram that permits—by means of subsequent change-over of the feed, product and waste positions as well as by changing over the operations for evacuating the stages and for subsequently filling them with differently enriched gas—the operation of the plant, according to its pre-established subsequent operative positions, until attaining the final production and waste flows with such enrichment rate as the market requires.

This invention will hereinafter be described in more detail in terms of a preferred but not the only embodiment, and with reference to the accompanying drawings which are provided merely for illustrative but not limitative purpose, and wherein:

FIG. 1 schematically shows an exemplifying elemental stage of a well known type as used in gaseous diffusion plants of conventional design for uranium hexafluoride enrichment.

FIG. 2 schematically shows an exemplifying cascade connection for a set of elemental stages as made use of at gaseous diffusion plants of conventional design.

Figure 3:
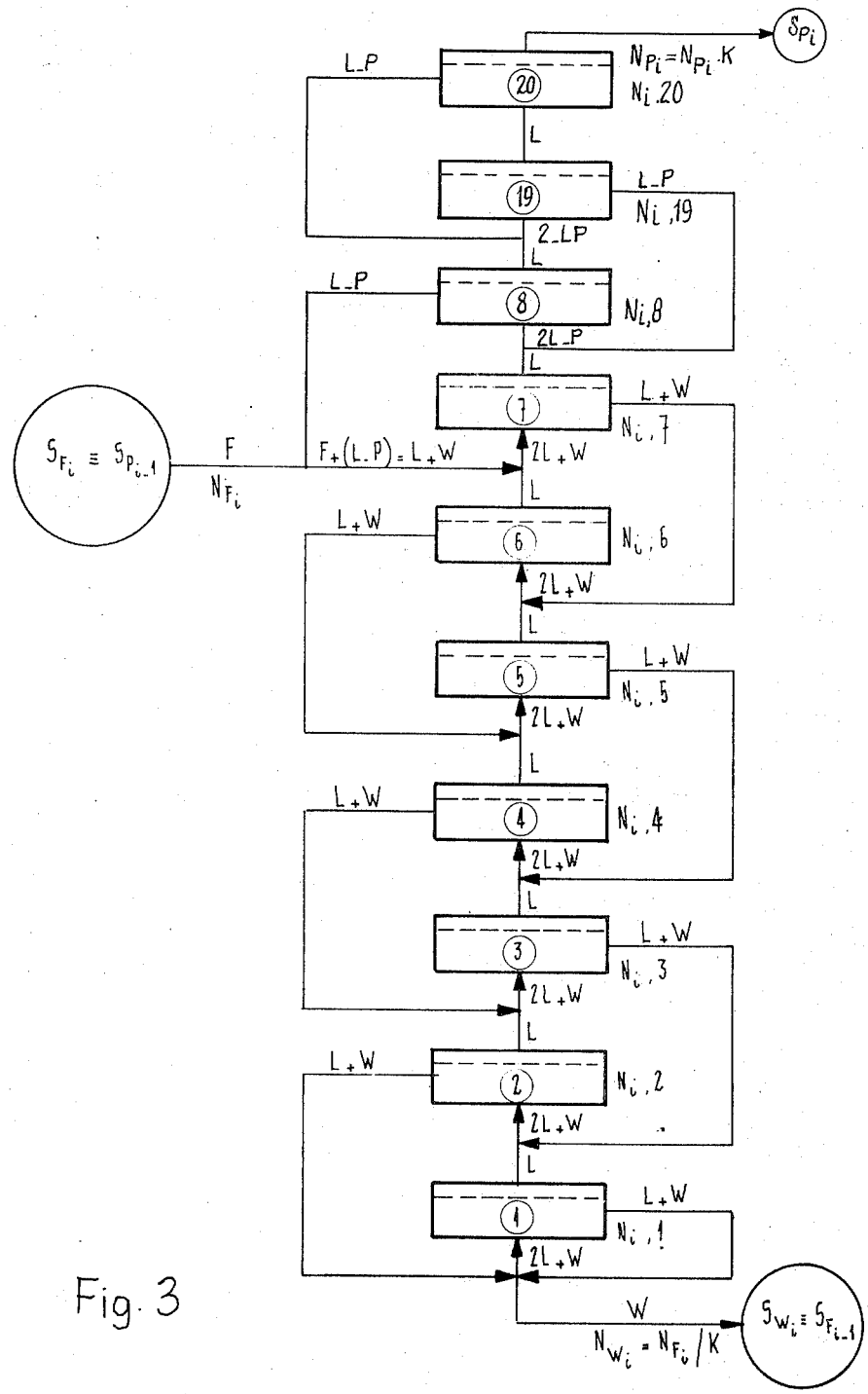

FIG. 3 schematically shows a set of cascade-interconnected elemental stages constituting a plant according to this invention and ready for operation in a generic operative position referenced "$i$."

Figure 4:
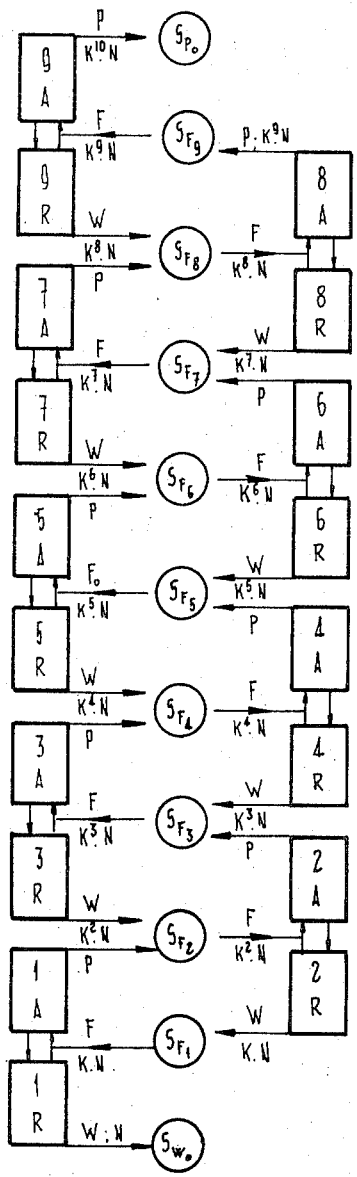

FIG. 4 schematically shows on the contrary nine subsequent operative positions of said simple set of elemental stages, said positions being adapted to supply—according to the present invention—a final product flow as well as a final waste flow, both having the required concentrations of enriched and impoverished uranium, respectively.

Figure 5:
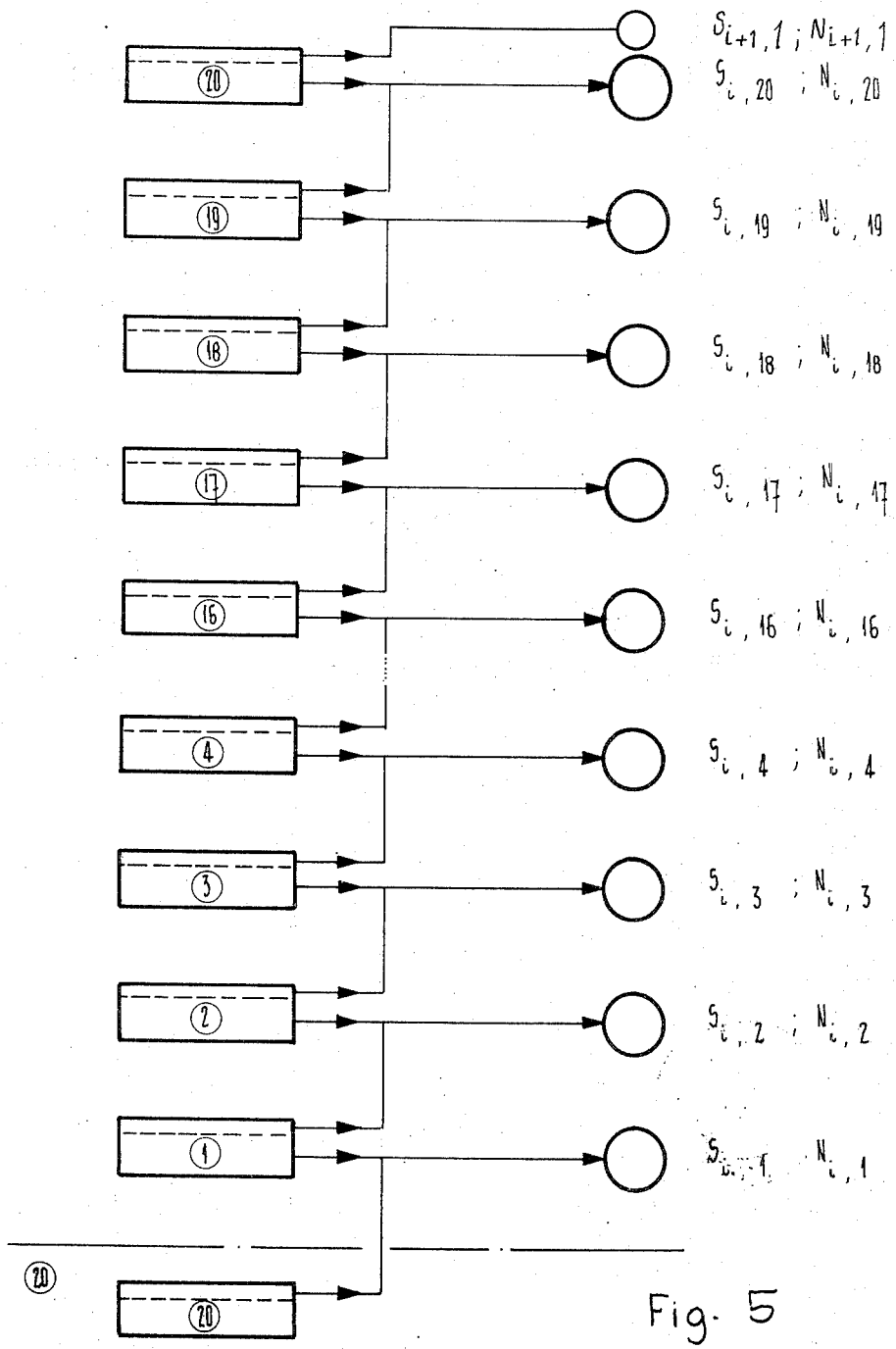

FIG. 5 schematically shows the plant at the evacuation phase of the stages, viz. the first phase of the plant change from operative position "$i$" over to the following position "$i+1$."

Figure 6:
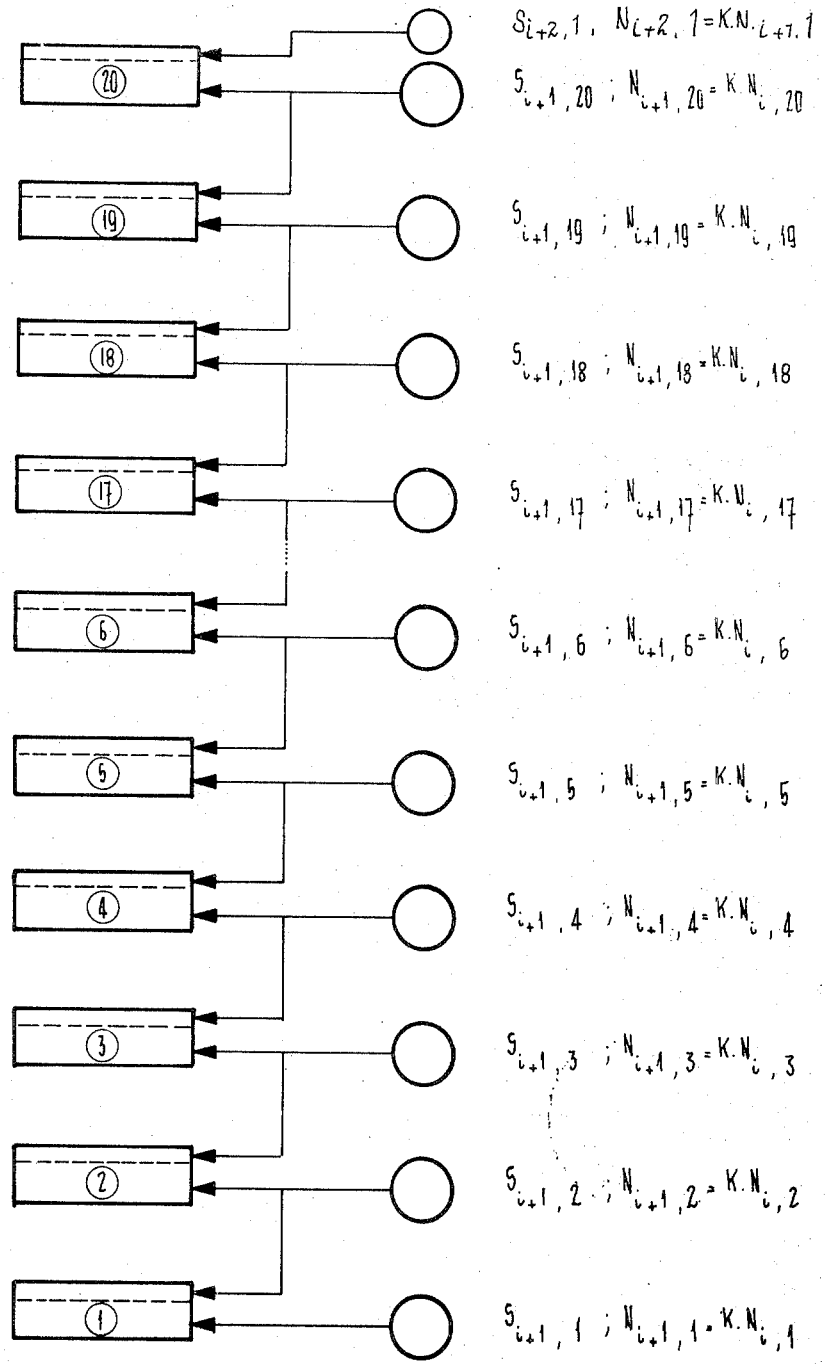

FIG. 6 schematically shows the same plant in the filling up phase of the stages, viz. the second phase of the plant change from operative position "i" over to the following position "$i+1$."

As already stated, the present invention substantially consists in letting a well defined set of per se known type elemental stages (such as those already described above and exemplified in FIGS. 1 and 2) work at different times and at correspondently different, gradually increasing enrichment feeds.

The number of elemental stages constituting the plant according to the present invention is in practice a fraction (for example one-tenth) of the number of stages necessary for obtaining the same required enrichment from a conventional plant.

FIG. 3 shows by way of example a plant consisting of 20 cascade-interconnected elemental stages, each individual stage being designed and arranged as already described and illustrated in FIG. 1.

This plant is therefore single step styled (all the stages being equally dimensioned) and the recovery section comprises, in the case assumed by FIG. 3, six stages while the enrichment section includes fourteen stages. FIG. 3 will be hereinafter described in still greater detail.

The above explanation makes it clear that when the plant in FIG. 3 is fed with a gas stream or flow having a certain $U^{235}F_6$ concentration, two stream or flows (with respectively higher and lower concentrations) are obtained at the ends. The enrichment process according to the present invention contemplates a temporary storage of the end flows in suitable operative reservoirs (as hereinafter explained in greater detail) from which the gas can be drawn for feeding the same plant by following phases; furthermore the feed, product and waste positions of the plant are periodically changed from certain operative storage reservoirs over to other similar reservoirs containing suitably enriched gas.

Should for example the plant produce a yield flow enrichment higher of a constant ratio $K(f.i. K = 1.2)$ in respect to the enrichment of the feed flow and correspondently supply a waste flow with an enrichment lower of the same constant ratio K in respect to the enrichment of the feed flow, and should the plant be for a certain time fed by the operative reservoir wherein 1 percent concentration enriched uranium herafluoride has been previously stored, then product and waste flows with 1.2 percent and 0.83 percent enrichment respectively are obtained and stored in the relevant operative reservoirs.

After a certain predetermined time, depending upon its design, during which the plant works under the above specified conditions—and when the feed operative reservoir has been practically evacuated while the end storage operative reservoirs have been more or less partially filled—the run of the plant is stopped. A change-over is then carried out and the plant is then worked under new conditions, according to which the uranium hexafluoride is drawn from the reservoir (previously filled) providing 1.20 percent enrichment, while the new end flows are let into the corresponding operative reservoirs, one now at 1.44 percent and the other now at 1 percent enrichment. By repeating several times these change-over operations, a work phase will eventually arrive during which the plant will supply uranium at the required enrichment and conversely another phase during which the plant will supply a waste flow with concentration equal to the concentration shown by the waste of conventional diffusion plants.

The need of the plant periodically changing over involves the provision of suitable service reservoirs; the quantities of uranium hexafluoride contained in the various elemental stages are by no means negligible and on the occasion of the change-over operation they would contact differently enriched gas. A process of degradation in respect of the desired objective of enrichment could therefore occur and this is generally not acceptable.

In order to avoid such a degradation it is necessary to remove the gas contained in each elemental stage and to store it in a suitable service reservoir, when each work operation is over, on idle plant. Subsequently each elemental stage is started to be filled with gas previously stored in a suitable reservoir and having an enrichment equal to the enrichment required in the new work phase.

The service reservoirs required by a plant according to the present invention are in number approximately equal to the number of stages required for a conventional plant for the gaseous diffusion isotopic separation designed to obtain the same final rate of isotopic concentration.

Each of the service reservoirs has a capacity sufficient to store the amount of the gas contained in each elemental stage. The storage of the uranium hexafluoride gas is preferably in liquid phase, under suitable pressure and temperature, in both the operative and storage reservoirs.

Unlike the conventional plants, the individual stage flows and dimensions can in a plant according to this invention be all equal while the operation times of the plant vary for the various operative phases or positions.

A plant particularly suitable for realizing the enrichment process according to the present invention will be hereinafter described as an example but not as a limitation, with particular reference to FIGS. 3 and 4.

The plant shown in FIG. 3 includes twenty equal cascade-interconnected elemental stages; the recovery and the enrichment sections include six and fourteen stages, respectively.

$S_{F_i}$, $S_{P_i}$, $S_{W_i}$ stand for the operative reservoirs respectively used for feed, product and waste, in the generical operation position "$i$"; F stands for the feed flow; L for the enriched flow of each stage, W for the waste flow, P being the product flow; N, KN, K$^2$N . . . etc. stand for the enrichments while K is a number signifying the ratio between the product enrichment and the feed as well as the waste respectively, said ratio being always constant for all the operative positions.

The various stages in FIG. 3 are indexed with progressive numbering from 1 to 20 and are interconnected in such a way as to show the operation of the plant in a generical position "$i$."

FIG. 4 schematically and in merely illustrative way shows nine plant operative positions, namely nine subsequent operation phases of the same plant under different enrichment stages. For convenience, the plant is shown in each operative position as being divided into two sections "A" and "R" which respectively indicate the enrichment stages set and the impoverishment lower set. $S_{F_1}$, $S_{F_2}$, . . . $S_{F_9}$ refer in said figure to the operative reservoirs, while $S_{P_0}$ and $S_{W_0}$ denote the end reservoirs for the storage of the final product and waste. Reference P, W, F and N, KN . . . K$^{10}$N correspond to the explanations already given in FIG. 3.

The plant comprising sections "A" and "R" comprises twenty elemental stages (interconnected as shown in FIG. 3), the various operative positions thereof being referenced by progressive numbering from 1 to 9 starting from the bottom of FIG. 4.

Before expounding in detail the duty operation of the plant, namely the series of the change-over operations adapted to let the plant work under the new operative positions contemplated herein, a few preliminary remarks are given.

The plant shown in FIG. 3 works up, in every operative position, feed flow "F," supplies product flow "P" and waste flow "W." The ratio between the product enrichment and feed as well as waste, respectively, is always constant for all the operative positions. It corresponds, for the generic operative position "$i$," to $$K = N_{P_i}/N_{F_i} = N_{F_i}/N_{W_i}$$

wherein being $N_{P_i}$, $N_{F_i}$, $N_{W_i}$ the enrichments of the above specified flows.

As FIG. 4 clearly shows, the plant operative positions are planned in such a way as to get $$N_{F_i} + 1 = N_{P_i}$$
$$N_{F_i} = N_{P_i} - 1$$
$$N_{W_i} = N_{F_i} - 1$$

for two following operative positions.

During a full operative cycle, the plant is changed over (as hereinafter explained) all the nine operative positions being contemplated.

With reference to FIG. 4, the plant in position 1 supplies waste at concentration N; in position 5 it is fed from the outside with a gas having $K^5N$ concentration; in position 9 it supplies the product with concentration (or enrichment) $K^{10}N$. As already stated, the time taken by the various operation phases varies from position to position.

By assuming, as a design feature, the correspondence of the $K^5N$ change-over with the change-over of the natural $U_{F_6}$, the feed position No. 5 (FIG. 4) divides the operative positions in two fields, one for the enrichment (positions 6 to 9) and the other for the recovery (positions 4 to 1).

If three following operative positions are considered and "Ti" is used a a reference to the time taken by the generical phase "$i$," it results that:

$$F_i \cdot T_i = W_{i+1} \cdot T_{i+1} + P_{i-1} \cdot T_{i-1}$$

To enable the plant duty to work in all operative positions contemplated, it is necessary to provide a set of service reservoirs adapted to contain the necessary quantities of $UF_6$ at their suitable enrichment rate. In this way, the operations for changing the plant over from an operative position to the following one do not involve any problem for reaching a duty condition; the gas, replaced stage-by-stage, permits the plant to be always duty working in any of its various operative positions.

These $UF_6$ quantities having a suitable enrichment rate are obtained according to the present invention, during the plant starting stage which includes a full operative cycle (for example nine operative positions as previously assumed for a normal run), totally developing through a time sufficient to allow the gas to be collected in said service reservoirs, in the quantity and with the enrichments necessary to permit the plant subsequently to operate at duty run in all the nine operative positions contemplated.

The starting of the plant, according to the present invention, can be carried out as follows:

When the plant is started, a vacuum is created therein and all of its stages are then completely filled with uranium hexafluoride having the naturally-occurring $U^{235}$ concentration.

The plant is afterwards set in duty condition and permitted to run in this condition for the time necessary to enable the collection of the quantity of $UF_6$ needed for the plant operation in both the contiguous operative positions in the two end operative reservoirs.

The plant run is stopped and the stages of the plant are evacuated by filling the corresponding service reservoirs which they are made ready for their following normal work.

The plant is again filled with the $UF_6$ coming from one of the two above-mentioned operative reservoirs (for example the $S_{F_6}$ reservoir) and brought to the duty condition in its new operative position.

After a suitable run time, the plant is stopped and evacuated stage by stage, thus getting the new service reservoirs ready.

The plant is then filled with the $UF_6$ produced in said second operative position and the already-specified operations are repeated.

By continuing such a sequence of operations, all relevant service reservoirs will become filled with $UF_6$ having the necessary enrichment rate, as soon as the plant has ended its work in all the operative positions contemplated for the enrichment section.

The same operations are repeated by feeding the plant successively with the gas stored in reservoirs $S_{F_4}$, $S_{F_3}$, $S_{F_2}$, $S_{F_1}$, and letting the plant work in the corresponding recovery operative positions.

At the end of the full cycle the plant will be ready for starting its regular service.

It is evident that, once the needed $UF_6$ quantities with suitable enrichment rate have been stored in the service reservoirs, the operations for changing the plant from an operative position over to the following one, do not involve and duty operation setting problem. Through the stage-by-stage gas replacement described above, the plant becomes duty-ready.

The total time for a plant according to this invention to be brought to its duty condition is therefore the sum of the individual times required by the plant to be brought to duty conditions in each of its various operative positions.

Bearing now in mind the structural arrangement (FIG. 3) and the operational diagram of the plant (FIG. 4), the plant regular operation develops, for example, as specified hereinafter:

The storage reservoir $S_{F_1}$ (FIG. 4) containing gas obtained during the operation starting stage and having KN enrichment, namely gas having concentration K times higher than the concentration (N) fixed for the final waste, is made ready as the feed F of the plant in its first operative position.

When feed reservoir $S_{F_1}$ is ready, the plant is filled stage-by-stage with gas taken from the previously filled service reservoirs and having a different enrichment rate and such as to let the plant develop its duty operation correspondently to feed $S_{F_1}$.

The plant is then kept operating for the time necessary to permit the feed flow to diffuse therethrough. When this operation time is over, the plant is stopped, the diffused flow with $K^2N$ concentration is collected in reservoir $S_{F_2}$ (already made ready and containing gas with $K^2N$ enrichment) while the "W" waste delivery— having "N" enrichment—is stored in $S_{W_0}$ and definitely discharged from the system. The various stages are evacuated and the gas from each of them is stored in the corresponding service reservoirs.

The plant is then kept running in its second operative position by first of all filling the stages with quantities of gas (always taken from the service reservoirs previously made ready during the starting operation) having the enrichments required for the duty operation correspondently to the $K^2N$ feed supplied by the gas from reservoir $S_{F_2}$; the plant is started in these conditions and stopped after it has treated the gas quantities corresponding to this operative position; all the operations as already specified for the run in the plant first operative position are then repeated.

The following third and fourth operative positions are carried out in the same way; the plant in its fifth position is fed not only with gas from reservoir $S_{F_5}$ (having $K^5N$ enrichment), but also with fresh gas having the naturally occurring isotopic concentration in a quantity sufficient to compensate for the discharge ($w_o$) with concentration N and for the product P with enrichment $K^{10}N$. The plant is then run, always with repetition of the already specified operations, in operative positions 5, 6, 7, 8 and 9; the last position enables one to obtain the product with $K^{10}N$ enrichment (directly utilizable on the market) and the waste flow $K^8N$, which is stored in reservoir $S_{F_8}$.

The quantity of gas enriched at the rate or to the concentration required by the market and the quantity of waste gas having concentration "N" equal to the one fixed for the final waste will be obtained at the end of a full cycle (nine operative positions).

It is possible to produce gas still further enriched as may be required and corresponding to the utilization needs, by repeating several times these full cycles of the plant.

The sequence of the nine operative positions which together bring about a fully operation cycle can also be, for example, as follows: the plant is fed, in its fifth operative position, with natural $UF_6$ gas added to the gas contained in reservoir $S_{F_5}$ (always carrying out the already said evacuation and filling operations of the stages); the plant is kept working in fifth, sixth, seventh, eighth and ninth operative positions; a flow of gas enriched as the market requires and a waste flow "W" with enrichment $K^8N$, will be finally obtained; this latter flow, stored in $S_{F_8}$, is used to feed the plant in its operative position eight and the same is made back down to operative position five. Two enrichment half-cycles are thus realized (from positions 5 to 9 and from positions 9 to 5). The operation is then changed over to position 4, fed by gas from reservoir $S_{F_4}$, and operative positions 3, 2, 1 are worked as already described; position 5 is again gone through while fed with gas from reservoir $S_{F_5}$ as well as with natural $UF_6$ gas. The other two recovery half-cycles are obtained through the same operation, with a total of four half-cycles, i.e., two full cycles.

The storage of the various quantities of $UF_6$ gas of various isotopic concentrations is for all the operative phases made in the relevant reservoirs with the gas in liquid form at suitable temperatures and pressures. The specific storage conditions are not described herein nor illustrated in the drawings for the sake of simplicity because they are per se old and well known to those skilled in the art.

The evacuation and filling phases of the various stages are shown in FIGS. 5 and 6, respectively.

FIG. 5 shows a plant consisting of 20 elemental stages in its generic operative position "$i$," wherein the gas is stored in service reservoirs $S_i, 1; S_i, 2 \ldots S_i, 20; S_{i+1, 1}$.

FIG. 6 shows the plant filling phase, namely the phase of change-over from operative position "$i$" to the following position "$i+1$."

Further description of these two figures is omitted as they are clearly self-explanatory.

According to another alternative, it too falling within the scope of the present invention, the number of the service reservoirs can be even less than the number of the stages multiplied by the number of the contemplated operative positions.

This further simplification can be obtained by partially mixing the gas contained in the various stages or by suitably sharing the total number of stages between the enrichment and the recovery sections.

As already stated, the process and the relevant plant of this invention utilize—without any structural alteration—the technology of the gaseous diffusion elemental stages and many units of same, as for example stage and recycling compressors as well as heat exchangers. The present invention is nevertheless fully realized no matter how the gaseous separation elemental unit is arranged and operated; it can in fact be also realized by making use of the ultracentrifugation technique, of separating nozzle units, or other arrangements based on separation systems known per se.

The invention contemplates in its practical aspects stationary means for interconnecting the various stages with the operative reservoirs and the service reservoirs; said reservoirs can be thus changed over the various stages (according to the operative positions) by means of baffle valves adapted to afford a pre-established arrangement for the feed, evacuation and filling of the same stages; the various reservoirs can moreover be connected with the stages through separately provided piping but also the feed, waste and product conveying pipes of each stage may be used for such purpose.

For the sake of still further explaining the invention, two detailed practical embodiment will now be described by way of explanation but not restriction:

EXAMPLE I

The following plant of this invention was designed to produce, through gaseous diffusion, uranium hexafluoride at 5.355 percent and to discharge $UF_6$ impoverished at 0.185 percent, these percentages referring to concentrations in terms of the $U^{235}$ isotope.

The plant consisted of 208 equal elemental stages of per se known-type, cascade interconnected; each stage had a 1,918 m² surface of barriers, the total surface of barriers consequently (for 208 stages amounting to approximately 398,950 m². These barriers offered a 1.735 kg $UF_6$/m².h.cm Hg permeability, their pores having a radius equal to one one-hundredth micron. The barriers worked at an upstream pressure of 40 cmHg and at a 4 cmHg downstream pressure.

The feed flow for each stage was 66.55 kg.$UF_6$/sec, approximately half of which diffused through the barriers while the remaining approximately half was recycled.

The plant was kept operating in nine subsequent functional positions (FIG. 4) : nine operative reservoirs were therefore provided for a total volume of approximately 73 m³ (UF₆ stored in liquid phase). The number of the service reservoirs was 1872, i.e., corresponding to the number of the stages (208) multiplied by the nine operative positions, each reservoir having a capacity of approximately 116 kg UF₆ stored in liquid phase.

After the plant was started up as previously described, and after all the storage reservoirs (operation and service) had been previously prepared, the plant was ready to duty operate in all the nine operation positions; in its first position it released gas at a 0.185 percent waste concentration; in its fifth position the plant was fed with UF₆ of natural isotopic concentration while in its last position it supplied UF₆ enriched as required (5.355 percent).

The plant was in any operative position fed by a 0.67 kg UF₆/sec flow, giving a 0.28 kg UF₆/sec product flow while the final waste delivery amounted to 0.39 kg UF₆/sec.

The concentrations of $U^{235}$ had always the constant ratio K = 1.4, in respect to the product, feed and waste flows.

To process a quantity of natural UF₆ equal to a 1029.65 tons/year feed, for producing 104.76 tons of 5.355 percent enriched UF₆ and 924.89 tons of 0.185 percent impoverished UF₆, the plant goes through (with a 95 percent utilization coefficient) 69 full operative cycles—each taking 120 hours—and goes for any cycle through all the nine operative positions.

The plant was provided with the required number of stage and recycle compressors (of known type) as well as with heat exchangers (of known type) adapted to create the pressures contemplated both upstream and downstream with respect to each barrier.

EXAMPLE II

The plant was designed in way to produce, always through gaseous diffusion, uranium hexafluoride at 5.8 percent and to discharge UF₆ impoverished at 0.191 percent.

The plant consisted of 210 equal elemental stages of known type, cascade interconnected; each stage had a 3,087 m² surface of barriers, the total surface of barriers consequently (for 210 stages) amounting approximately to 648.262 m² about. Said barriers offered a 1.735 Kg UF₆/m².h.cm Kg permeability, their pores having radius equal to one one-hundredth micron. The barriers worked at an upstream pressure of 40 cmHg and at a 4 cmHg downstream pressure.

The feed flow of each stage was 107.118 Kg.UF₆/sec, the approximately half of which diffused through the barriers while the remaining approximately half was recycled.

The plant was kept operating in 12 subsequent functional positions (FIG. 4): 12 operative reservoirs were therefore provided for the total volume of UF₆ stored in liquid phase. The number of the service reservoirs was 1,365. After the plant was started as previously said, and after all the storage reservoirs (operation and service) had been previously prepared, the plant was ready to duty operate in all the 12 operation positions; in its first position it released gas at a 0.191 percent waste concentration; in its fifth position the plant was fed with UF₆ at natural concentration while in its last position it supplied UF₆ enriched as required (5.8 percent).

The plant was in any operative position fed by a 1.2054 KgUF₆/sec flow, giving a 0,5241 Kg UF₆/sec product flow while the final waste delivery amounted to 0.6813 Kg UF₆/sec.

The concentrations of $U^{235}$ had always the constant ratio K = 1.3 in respect to the product, feed and waste flows. To process a quantity of natural UF₆ equal to a 756.950 tons/year feed, for producing 70.117 tons of 5.8 percent enriched UF₆ and 686.833 tons of 0.191 percent impoverished UF₆, the plant goes through 55 full operative cycles — each taking 150 hours — and goes for any cycle through all the 12 operation positions.

The plant was provided with a suitable number of stage and recycle compressors as well as with heat exchangers (of known type) apt to grant the pressures foreseen upstream and downstream each barrier.

What is claimed is:

1. A process for uranium isotopic enrichment using a simple cascade of per se known type elemental stages employed in gaseous diffusion processes, said process consisting essentially of enriching a flow of natural uranium hexafluoride up to an $U^{235}F_6$ concentration required by the market, by means of several successive partial enrichments of gradually increasing rate obtained by letting said simple cascade-connected stages, and always the same, operate according to successive operating positions forming an enrichment cycle which consists essentially in:

a. feeding all the stages of said cascade with naturally concentrated UF₆, letting said stages work so as to collect, at the cascade ends, required quantities of an enriched gas an an impoverished gas respectively, stopping the cascade feeding and storing said two flows;

b. evacuating all stages and storing separately their contents of gas at various concentration rates;

c. feeding again all the stages of the same cascade with the enriched flow from a, letting the cascade work, stopping the diffusion and storing separately the gases from all the stages;

d. repeating the steps of c after feeding the stages with the impoverished gas of a;

e. repeating again the steps of c and d until stored gases in quantities and with the enrichments required for the subsequent duty operation of the process are obtained;

f. then operating the cascade of stages in each of said subsequent operative positions by feeding the cascade every time with the product and waste flows obtained from the two contiguous operative positions, contemporaneously replacing the gas of each stage with a previously-obtained gas having an isotopic concentration required for the duty operation of the cascade in each of said operative positions; and g. repeating the steps of f by changing over the feeding and the gas replacing, stage-by-stage, until the isotopic concentration required by the market both for the enriched and the waste flows is obtained.

2. A process according to claim 1, wherein said operations for changing over the feeds and replacing the gas stage-by-stage are carried out at the end of each operative position and consist essentially in stopping the diffusion process, in separately storing the enriched and the impoverished flows, in evacuating all the elemental stages and separately storing the gas from each stage, in filling again said stages with quantities of previously-prepared gas having enrichments stage-by-stage corresponding to the enrichments required for the duty operation in the following functional position, said series of operations together with said change-over of the feeds being adapted for the regular work of the cascade of stages in all the contemplated operative postiions.

3. A process according to claim 1, wherein said quantities of gas with different enrichments, necessary to allow said change-over operations of the feeds and said replacements of the gas within each stage in any operative position, are obtained during the run start phase of the cascade of stages and stored separately in suitable reservoirs.

4. A process according to claim 1, wherein said quantities of differetly enriched gas, coming from the stages and from the ends of the cascade of stages, collected in storage reservoirs when the operation in each operative position is over, are stored in liquid phase, the liquefaction of said gas being carried out according to per se known technique, the liquid phase material being revaporized when and as required.

5. A process according to claim 1, wherein said gases are stored in solid phase.

6. A process according to claim 1, wherein for a cascade of an equal number of elemental stages the ratio between product and respectively feed as well as waste enrichments is always substantially constant for all the various operational positions.

7. Apparatus for uranium isotopic enrichment by gaseous separation comprising a set of elemental stages of gas separation which are cascade-interconnected in such a way as to supply, from its two ends, after a feed flow has been worked out, quantities of enriched and impoverished gas, operation reservoirs for the separate storing of the enriched and impoverished gas quantities worked out by the plant in each of said operative positions, a set of service reservoirs for the temporary storage of the differently enriched gas quantities contained in each stage on idle plant, means for storing the various gas quantities in non-gaseous phase, the elemental stages of said cascade as well as said operation and service reservoirs being interconnected through a set of devices adapted for allowing, by means of subsequent changing over of the feed, product and waste positions as well as through the change-over of the operations for evacuating the various stages and for subsequently filling them with differently enriched gases, the duty operation of the plant in all its subsequent pre-established operative positions.

8. Apparatus according to claim 7, wherein the gas separation stages include gaseous diffusion devices.

9. Apparatus according to claim 8, wherein the gas separation elemental stages are all reciprocally equal, thus making the whole a single-step plant.

10. Apparatus according to claim 7, wherein said set of devices adapted to allow said change-over from an operative position to the following one, comprises a set of pumps, valved devices and pipings distinct from the feed, waste and product pipings, which connect each stage with the service and the operation reservoirs, thereby permitting the change-over of said set of reservoirs for each stage through baffle valves.

11. Apparatus according to claim 7, including a number of service reservoirs equal to the number of the stages multiplied by the number of the contemplated operation positions, and a number of operative reservoirs equal to the number of the contemplated operation positions, in addition to the two end reservoirs for storing the enriched and the impoverished flows of gas.

12. Apparatus according to claim 7, wherein the gas separation stages include ultra-centrifugal separators.

13. Apparatus according to claim 7, wherein the gas separation stages include gas separating nozzle units.

* * * * *